(12) United States Patent
Kuramoto et al.

(10) Patent No.: US 8,477,777 B2
(45) Date of Patent: Jul. 2, 2013

(54) BRIDGE APPARATUS AND COMMUNICATION METHOD

(75) Inventors: Michio Kuramoto, Kawasaki (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 13/178,848

(22) Filed: Jul. 8, 2011

(65) Prior Publication Data

US 2012/0008633 A1 Jan. 12, 2012

(30) Foreign Application Priority Data

Jul. 12, 2010 (JP) ................................. 2010-157955

(51) Int. Cl.
*H04L 12/28* (2006.01)
(52) U.S. Cl.
USPC ............ 370/389; 370/238; 370/401; 370/428
(58) Field of Classification Search
None
See application file for complete search history.

(56) References Cited

U.S. PATENT DOCUMENTS

| 7,046,663 | B1 * | 5/2006 | Temoshenko et al. | 370/390 |
| 7,149,214 | B2 * | 12/2006 | Wu et al. | 370/389 |
| 7,817,561 | B2 * | 10/2010 | Kwapniewski et al. | 370/238 |
| 2009/0106773 | A1 * | 4/2009 | Lee et al. | 719/313 |
| 2009/0207842 | A1 | 8/2009 | Sekido | |
| 2011/0122889 | A1 * | 5/2011 | Pacella et al. | 370/428 |
| 2012/0008633 | A1 * | 1/2012 | Kuramoto et al. | 370/401 |

FOREIGN PATENT DOCUMENTS

| JP | 2004-193821 A | 7/2004 |
| JP | 2009-194706 A | 8/2009 |

* cited by examiner

*Primary Examiner* — Robert Wilson
(74) *Attorney, Agent, or Firm* — Fujitsu Patent Center

(57) ABSTRACT

A bridge apparatus including a first line card and a second line card is provided. The first line card includes a first memory storing an association between a line card and a destination address, a first receiver receiving a frame from the second line card including a flag indicating whether a memory of the second line card stores the destination address of the frame, a determination circuit determining whether the first memory stores the destination address of the received frame, when the first flag added to the received frame indicates that the second memory does not store the destination address of the frame, and a first transmitter transmitting, when the determination circuit determines the first memory stores the destination address of the frame, address information associated with at least the destination address of the frame to the second line card, the destination address being stored by the first memory.

15 Claims, 14 Drawing Sheets

| MAC ADDRESS | CARD IDENTIFICATION NUMBER | PHYSICAL-PORT IDENTIFICATION NUMBER |
|---|---|---|
| MAC#1 | CARD #1 | PORT #1 |
| MAC#2 | CARD#2 | PORT#1 |
| MAC#3 | CARD#2 | PORT#2 |
| . | . | . |
| . | . | . | ns.
BRIDGE APPARATUS AND COMMUNICATION METHOD

CROSS-REFERENCE TO RELATED APPLICATION

This application is based upon and claims the benefit of priority of the prior Japanese Patent Application No. 2010-157955, filed on Jul. 12, 2010, the entire contents of which are incorporated herein by reference.

FIELD

Embodiments of the present invention relate to a bridge apparatus and a communication method.

BACKGROUND

Bridge apparatuses are available to connect multiple terminal apparatuses. Each bridge apparatus has multiple physical ports coupled to the terminal apparatuses, for example, personal computers, routers, and so on. The bridge apparatus outputs a frame, input to one of the ports, to another port corresponding to a destination. As a result, forwarding of the frame is performed between the multiple apparatuses.

There is also a bridge apparatus into which multiple line cards (e.g., interface cards or communication cards) can be incorporated. Each of the line cards has multiple physical ports coupled to the terminal apparatuses. A first one of the line cards transmits (or forwards) a frame, input to one of the physical ports, to a second one of the line cards which has the physical port corresponding to a destination address. The second line card outputs the transmitted frame to another physical port corresponding to the destination address. As a result, forwarding of the frame is performed between the multiple apparatuses.

Each line card manages a MAC (media access control) address table in which MAC addresses of the terminal apparatuses coupled to the physical ports of the line card and the physical ports of the other line cards are associated with the physical ports and the line cards. More specifically, each line card refers to, of a MAC destination address (MAC DA) and a MAC source address (MAC SA) which are included in the frame, the MAC source address to thereby learn the MAC address of the terminal apparatus as well as the physical port and the communication card to which the terminal apparatus is coupled. Thereafter, when a frame is input, the line card refers to the MAC address table to determine which line card and which physical port therein the input frame is to be output. The ingress line card (i.e., the line card to which the frame is input) then adds, for example, in-apparatus header information (or a routing header) to the frame and transmits the resulting frame to another line card in the bridge apparatus. On the other hand, when a frame including a MAC destination address that is not stored (i.e., not contained) in the MAC address table is input, the frame is broadcast to all of the physical ports of all of the line cards as a frame whose destination is unknown. This processing is referred to as "flooding".

For example, Japanese Unexamined Patent Application Publication Nos. 2009-194706 and 2004-193821 are disclosed as related art.

SUMMARY

According to an aspect of the embodiment, a bridge apparatus includes a first line card and a second line card. The first line card of the bridge apparatus includes a first memory that stores an association between a line card and a destination address, a first receiver that receives a frame from the second line card that includes a flag indicating whether a memory of the second line card stores the destination address of the destination of the frame, a determination circuit that determines whether or not the first memory stores the destination address of the received frame, when the first flag added to the received frame indicates that the second memory does not store the destination address of the frame, and a first transmitter that transmits, when the determination circuit determines that the first memory stores the destination address of the frame, address information associated with at least the destination address of the frame to the second line card, the destination address being stored by the first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates the data structure of a MAC address table;

DESCRIPTION OF EMBODIMENTS

Modes for carrying out the embodiments of the present invention will be described below with reference to the accompanying drawings.

(1) Configuration of Bridge Apparatus

Figure 1:
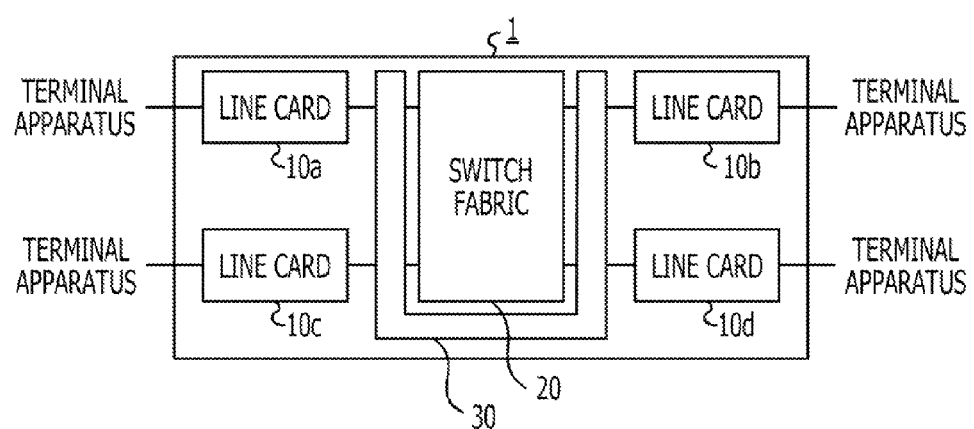
FIG. 1 is a block diagram illustrating the configuration of a bridge apparatus according to an embodiment.

The configuration of a bridge apparatus 1 according to an embodiment will be described with reference to FIG. 1. FIG. 1 is a block diagram illustrating the configuration of the bridge apparatus 1 according to the embodiment.

As illustrated in FIG. 1, the bridge apparatus 1 includes line cards 10a, 10b, 10c, and 10d, a switch fabric 20, and a control bus 30. An interface card or communication card is one example of the line card. The individual line cards 10a to 10d may be referred to as "line cards 10" hereinafter, when they are described without distinction therebetween. The number of line cards 10 in the bridge apparatus 1 illustrated in FIG. 1 is merely an example, and may be any number. It is, however, preferable that the bridge apparatus 1 has multiple (i.e., two or more) line cards 10. The line cards 10a to 10d may be detachably attached to the bridge apparatus 1 or may be fixed to the bridge apparatus 1.

The line cards 10a to 10d are interconnected through the switch fabric 20. The line cards 10a to 10d exchange a frame 400 (e.g., a data frame 400a or learning information frame 400b, described below) with each other by using a user plane formed through the switch fabric 20.

The line cards 10a to 10d may also be interconnected through the control bus 30. However, since it is not necessary for the bridge apparatus 1 to have the control bus 30, the line cards 10a to 10d do not necessarily have to be interconnected through the control bus 30. By using the control plane formed through the control bus 30, the line cards 10a to 10d may also exchange arbitrary information (e.g., a learning-information frame 400b (described below), which is control information, or learning information included in the learning-information frame 400b).

The line cards 10a to 10d are coupled to terminal apparatuses through corresponding physical ports 110 described below. Examples of the terminal apparatuses include a personal computer, a work station, a network terminal, a router, other information processing equipment, and network processing equipment. A frame 400 input from the terminal apparatus to the bridge apparatus 1 is forwarded to another terminal apparatus via the line cards 10 and the switch fabric 20.

(2) Configuration of Line Card

Figure 2:
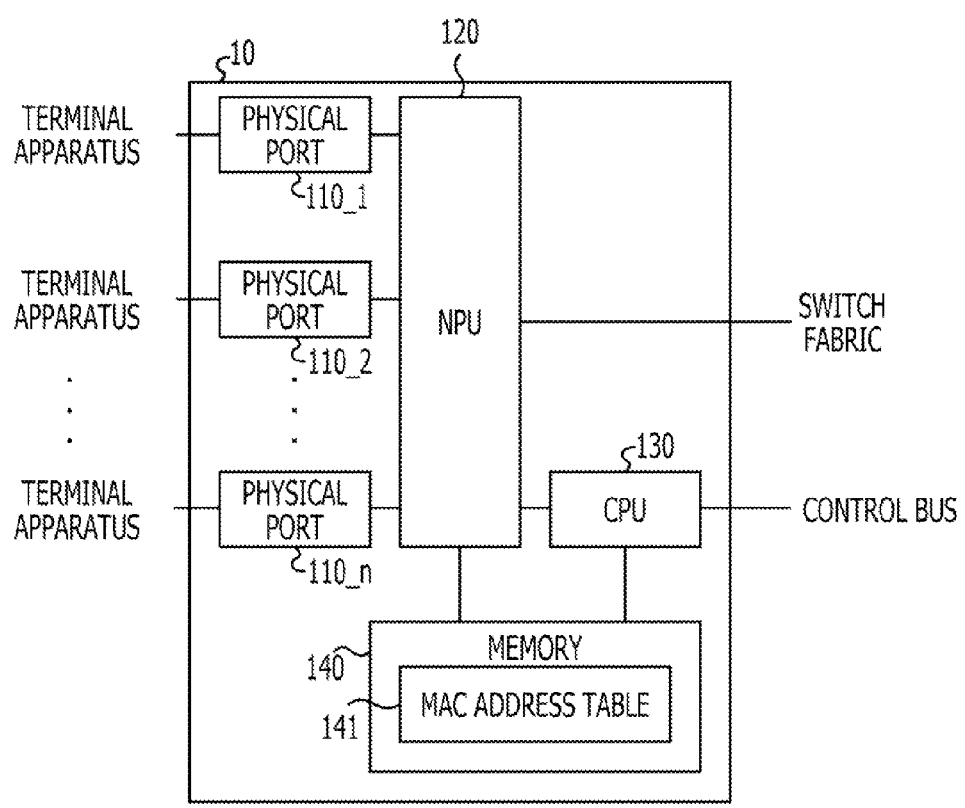
FIG. 2 is a block diagram illustrating the configuration of a line card in the embodiment.

The configuration of each line card 10 in the present embodiment will now be described with reference to FIG. 2. FIG. 2 is a block diagram illustrating the configuration of each line card 10 in the present embodiment.

As illustrated in FIG. 2, the line card 10 includes n physical ports 110_1 to 110_n (where n is an integer greater than or equal to 1) and an NPU (network processing unit) 120, a CPU (central processing unit) 130, and a memory 140. The n physical ports 110_1 to 110_n may be referred to as "physical ports 110", when they are described without distinction therebetween.

The n physical ports 110_1 to 110_n serve as connection ports for connection to a network. The terminal apparatuses are coupled to the corresponding n physical ports 110_1 to 110_n. It is preferable that one terminal apparatus be coupled to one physical port 110.

The NPU 120 is coupled to the physical ports 110, the CPU 130, and the memory 140 through an internal bus to perform processing for forwarding the frame 400. More specifically, the NPU 120 transmits the frame 400, input from one of the terminal apparatuses via the physical port 110, to another of the line cards 10 through the switch fabric 20. In addition, the NPU 120 transmits a frame 400, input from another line card 10 through the switch fabric 20, to one of the terminal apparatuses via the physical port 110. Details of the configuration of the NPU 120 are described later (with reference to FIG. 4).

The CPU 130 is electrically coupled to the NPU 120 and the memory 140 through the internal bus. The CPU 130 may be a central processing device for controlling the overall operation of the line card 10 in accordance with, for example, firmware. The CPU 130 may perform processing for transmitting/receiving information to/from another line card 10 (specifically, the CPU 130 included in another line card 10) in the same bridge apparatus 1 through the control bus 30, for example.

The memory 140 includes a storage area for temporarily storing data to be used internally by the line card 10. The memory 140 may also includes, for example, a storage area that stores a program (or firmware) for performing an operation as the line card 10. The number of memories 140 included in the line card 10 may also be plural so as to correspond to the types of information stored therein. For example, a memory 140 for temporarily storing data used internally by the line card 10 and a memory 140 for storing a program for performing an operation as the line card 10 may be provided independently. Examples of the memory 140 include a semiconductor memory, such as a RAM (random access memory), and other various types of recording medium.

In addition, the memory 140 stores a MAC (media access control) address table 141. The data structure of the MAC address table 141 will be described below with reference to FIG. 3. FIG. 3 illustrates the data structure of the MAC address table 141.

As illustrated in FIG. 3, the MAC address table 141 contains one or more entries, each indicating an association between a MAC address of the terminal apparatus and at least one of an identification number of the line card 10 coupled to the terminal apparatus and an identification number of the physical port 110 coupled to the terminal apparatus.

For example, the MAC address table 141 may contain one or more entries, each indicating an association between a MAC address of the terminal apparatus coupled to the physical port 110 of the line card 10 including this MAC address table 141 and at least one of an identification number of the line card 10 and an identification number of the physical port 110.

Alternatively, the MAC address table 141 may contain one or more entries, each indicating an association between a MAC address of the terminal apparatus coupled to the physical port 110 of the line card 10 other than the line card 10 including this MAC address table 141 and at least one of an identification number of the other line card 10 and an identification number of the physical port 110.

In particular, the MAC address table 141 contains one or more entries already learned by the line card 10 including the MAC address table 141 (i.e., one or more entries, each indicating an association between the MAC address of the terminal apparatus which has already been learned by the line card 10 and at least one of the identification numbers of the line card 10 and the physical port 110 coupled to the terminal apparatus).

In the example illustrated in FIG. 3, the MAC address table 141 contains multiple entries indicating associations between MAC addresses of the terminal apparatuses and identification numbers of both of the line cards 10 and the physical ports 110 coupled to the terminal apparatuses. More specifically, one of the entries illustrated in FIG. 3 indicates that the terminal apparatus having a MAC address "MAC #1" is coupled to the physical port "port #1" of the line card 10 "card #1". Similarly, another one of the entries illustrated in FIG. 3 indicates that the terminal apparatus having a MAC address "MAC #2" is coupled to the physical port "port #1" of the line card 10 "card #2". Similarly, another one of the entries illustrated in FIG. 3 indicates that the terminal apparatus having a MAC address "MAC #3" is coupled to the physical port "port #2" of the line card 10 "card #2".

The MAC address table 141 may also include, in addition to or in place of the entries including the identification numbers of the physical ports 110, entries including the identification numbers of logical ports which are uniquely associated with the physical ports 110.

Now, a method for MAC-address learning (in other words, a method for adding an entry to the MAC address table 141) performed by the line card 10 will be described with reference to the data structure of the frame 400 illustrated in FIG. 4.

Figure 4:
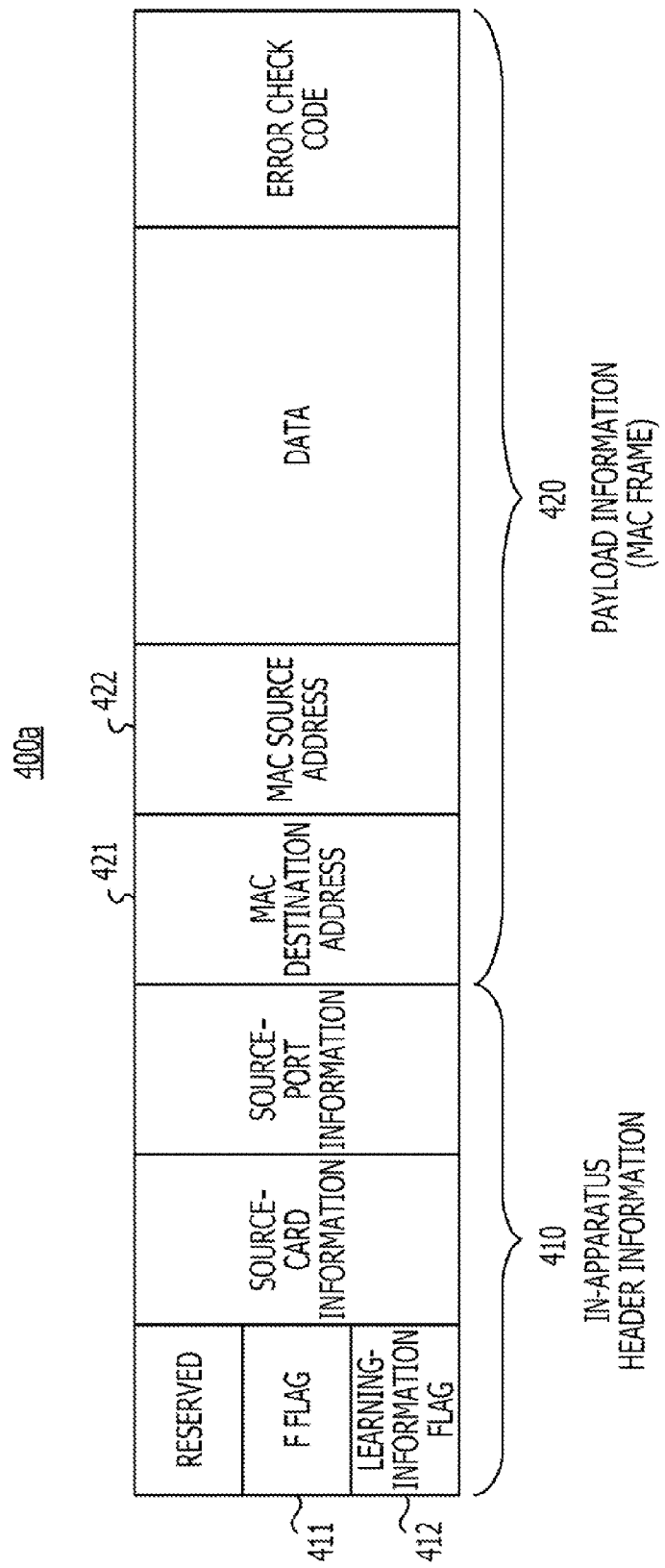
FIG. 4 illustrates the data structure of a data frame.

As illustrated in FIG. 4, the frame 400 (e.g., a data frame 400a described below) transmitted/received between the line cards 10 through the switch fabric 20 contains in-apparatus header information 410 that is referred to only in the bridge apparatus 1 and payload information 420 containing information to be forwarded using the frame 400. FIG. 4 illustrates, as one example of the frame 400, a data frame 400a whose payload information 420 contains a frame to be transmitted/received between the terminal apparatuses (e.g., a MAC frame, such as an Ethernet® frame).

The in-apparatus header information 410 includes a reserved area, an F (flooding) flag 411, a learning-information flag 412, source-card information indicating the line card 10 that is a source of the frame 400, and source-port information indicating the physical port 110 that is a source of the frame 400. The F flag 411 and the learning-information flag 412 are described in detail later.

A MAC frame contained in the payload information 420 includes a MAC destination address (MAC DA) 421 indicating the MAC address of the terminal apparatus that is a destination of the MAC frame and a MAC source address (MAC SA) 422 indicating the MAC address of the terminal apparatus that is a source of the MAC frame.

Each line card 10 refers to the MAC source address 422 in the frame 400 transmitted from another line card 10 through the switch fabric 20. When the MAC source address 422 has not been learned yet (i.e., an entry for the MAC source address 422 is not recorded or contained in the MAC address table 141), the line card 10 extracts the MAC source address 422, the source-card information, and the source-port information from the frame 400. The line card 10 then adds the extracted MAC source address 422, source-card information, and source-port information to the MAC address table 141 as a new entry. As a result, the line card 10 learns the MAC address (in other words, adds a corresponding entry to the MAC address table 141).

(3) Configuration of NPU

Figure 5:
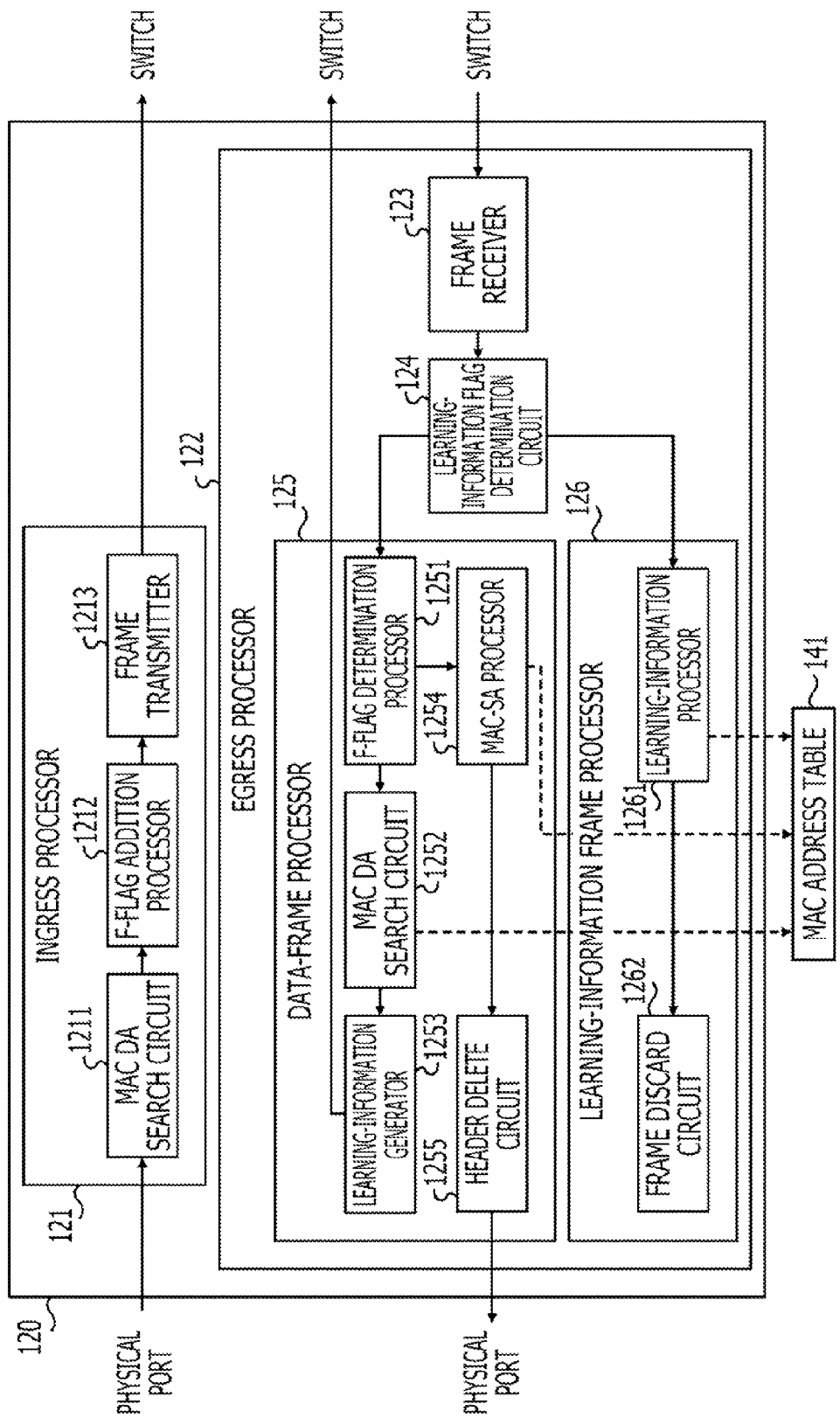
FIG. 5 is a block diagram illustrating the configuration of an NPU (Network Processing Unit) in the embodiment.

The configuration of the NPU 120 in the present embodiment will now be described with reference to FIG. 5. FIG. 5 is a block diagram of the configuration of the NPU 120 in the present embodiment. The NPU 120 is implemented by, for example, a semiconductor chip having an integrated circuit. At least one of blocks in the NPU 120 may be implemented by an integrated circuit. Alternatively, the arrangement may be such that a program is stored in, for example, the recording medium, such as the memory 140 (as illustrated in FIG. 2), coupled to the NPU 120 and the NPU 120 reads the program to realize functions of the individual blocks.

As illustrated in FIG. 5, the NPU 120 includes an ingress processor 121 for performing ingress processing on a frame 400 and an egress processor 122 for performing egress processing on a frame 400. The ingress processing involves, for example, processing for receiving a MAC frame transmitted from the terminal apparatus via the physical port 110 and transmitting a frame 400 including the MAC frame to another line card 10 through the switch fabric 20. On the other hand, the egress processing involves, for example, processing for receiving a frame 400 transmitted from another line card 10 through the switch fabric 20 and transmitting a MAC frame included in the frame 400 to the terminal apparatus via the physical port 110.

It is preferable that the NPU 120 have both of the ingress processor 121 and the egress processor 122. The NPU 120, however, may have either one of the ingress processor 121 and the egress processor 122.

The ingress processor 121 includes a MAC DA search circuit 1211, an F-flag addition processor 1212, and a frame transmitter 1213.

The MAC DA search circuit 1211 obtains the MAC frame transmitted from the terminal apparatus via the physical port 110. The MAC DA search circuit 1211 determines whether or not an entry for the MAC destination address 421 included in the obtained MAC frame is contained in the MAC address table 141. That is, the MAC DA search circuit 1211 determines whether or not an entry including the same MAC address as the MAC destination address 421 included in the MAC frame transmitted from the terminal apparatus via the physical port 110 is contained in the MAC address table 141. It is preferable that the MAC address table 141 referred to by the MAC DA search circuit 1211 be the MAC address table 141 stored in the line card 10 including this MAC DA search circuit 1211. In other words, it is preferable that the MAC address table 141 referred to by the MAC DA search circuit 1211 not be the MAC address table 141 stored in the line card 10 other than the line card 10 including this MAC DA search circuit 1211. The MAC DA search circuit 1211 outputs a result of the determination, together with the obtained MAC frame, to the F-flag addition processor 1212.

The F-flag addition processor 1212 sets the F flag 411 contained in the frame 400. More specifically, when an entry for the MAC destination address 421 is not contained in the MAC address table 141, the F-flag addition processor 1212 sets, for the F flag 411, a flag value indicating that a corresponding entry is not contained. On the other hand, when an entry for the MAC destination address 421 is contained in the MAC address table 141, the F-flag addition processor 1212 sets, for the F flag 411, a flag value indicating that a corresponding entry is contained. A description below is given in conjunction with an example in which "1" is used as a flag value indicating that an entry for the MAC destination address 421 is not contained in the MAC address table 141 and "0" is used as a flag value indicating that an entry for the MAC destination address 421 is contained in the MAC address table 141. The F-flag addition processor 1212 outputs the frame 400 in which the F flag 411 is set (i.e., the data frame 400a whose payload information 420 includes the MAC frame) to the frame transmitter 1213.

In addition to setting the F flag 411, the F-flag addition processor 1212 may generate a data frame 400a by adding in-apparatus header information 410 to the MAC frame. Alternatively, an arbitrary processor (e.g., the MAC DA search circuit 1211, the frame transmitter 1213, or another processor (not illustrated)) located prior to or subsequent to the F-flag addition processor 1212 may generate a data frame 400a by adding in-apparatus header information 410 to the MAC frame.

The frame transmitter 1213 transmits the data frame 400a to another line card 10 through the switch fabric 20. More specifically, when an entry for the MAC destination address 421 is not contained in the MAC address table 141, the frame transmitter 1213 transmits the data frame 400a to all of the other line cards 10 included in the bridge apparatus 1 (i.e., performs flooding). On the other hand, when an entry for the MAC destination address 421 is contained in the MAC address table 141, the frame transmitter 1213 transmits the data frame 400a to the line card 10 corresponding to the MAC destination address 421 (i.e., performs unicasting).

The egress processor 122 includes a frame receiver 123, a learning-information flag determination circuit 124, a data-frame processor 125, and a learning-information frame processor 126.

The frame receiver 123 obtains a frame 400 (e.g., a data frame 400a or a learning-information frame 400b) transmitted from another line card 10 through the switch fabric 20. The frame receiver 123 outputs the obtained frame 400 to the learning-information flag determination circuit 124.

The learning-information flag determination circuit 124 examines the contents of the learning-information flag 412 included in the frame 400 received by the frame receiver 123. More specifically, by referring to the learning-information flag 412, the learning-information flag determination circuit 124 determines whether or not the frame 400 received by the frame receiver 123 is a data frame 400a or a learning-information frame 400b. When the frame 400 is a data frame 400a, the learning-information flag determination circuit 124 outputs the data frame 400a to the data-frame processor 125. On the other hand, when the frame 400 is a learning-information frame 400b, the learning-information flag determination circuit 124 outputs the learning-information frame 400b to the learning-information frame processor 126.

The data-frame processor 125 performs processing on the data frame 400a. The data-frame processor 125 includes an F-flag determination processor 1251, a MAC DA search circuit 1252, a learning-information generator 1253, a MAC-SA processor 1254, and a header delete circuit 1255.

The F-flag determination processor 1251 examines the contents of the F flag 411 included in the data frame 400a. More specifically, the F-flag determination processor 1251 determines whether or not the F flag 411 is "1" (i.e., the value indicating that an entry for the MAC destination address 421 is not contained in the MAC address table 141 in the line card 10 that is the source of the data frame 400a) or "0" (i.e., the value indicating that an entry for the MAC destination address 421 is contained in the MAC address table 141 in the line card 10 that is the source of the data frame 400a). When the F flag 411 is "1", the F-flag determination processor 1251 outputs the data frame 400a to the MAC DA search circuit 1252 and the MAC-SA processor 1254. On the other hand, when the F flag 411 is "0", the F-flag determination processor 1251 outputs the data frame 400a to the MAC-SA processor 1254.

The MAC DA search circuit 1252 determines whether or not an entry for the MAC destination address 421 included in the data frame 400a is contained in the MAC address table 141. It is preferable that the MAC address table 141 referred to by the MAC DA search circuit 1252 be the MAC address table 141 stored in the line card 10 including this MAC DA search circuit 1252. In other words, it is preferable that the MAC address table 141 referred to by the MAC DA search circuit 1252 not be the MAC address table 141 stored in the line card 10 other than the line card 10 including the MAC DA search circuit 1252. When an entry for the MAC destination address 421 is contained in the MAC address table 141, the MAC DA search circuit 1252 outputs the contents of the MAC address table 141, together with the data frame 400a, to the learning-information generator 1253. On the other hand, when an entry for the MAC destination address 421 is not contained in the MAC address table 141, the MAC DA search circuit 1252 ends the operation.

When the MAC DA search circuit 1252 determines that an entry for the MAC destination address 421 is contained in the MAC address table 141, the learning-information generator 1253 generates a learning-information frame 400b. In this case, the learning-information generator 1253 generates a learning-information frame 400b on the basis of the contents of the MAC address table 141 output from the MAC DA search circuit 1252. The learning-information generator 1253 transmits the generated learning-information frame 400b to all of the line cards 10 included in the bridge apparatus 1 (i.e., performs flooding). Alternatively, the learning-information generator 1253 may transmit the generated learning-information frame 400b to the line card 10 that is the source of the data frame 400a (i.e., may perform unicasting).

Figure 6:
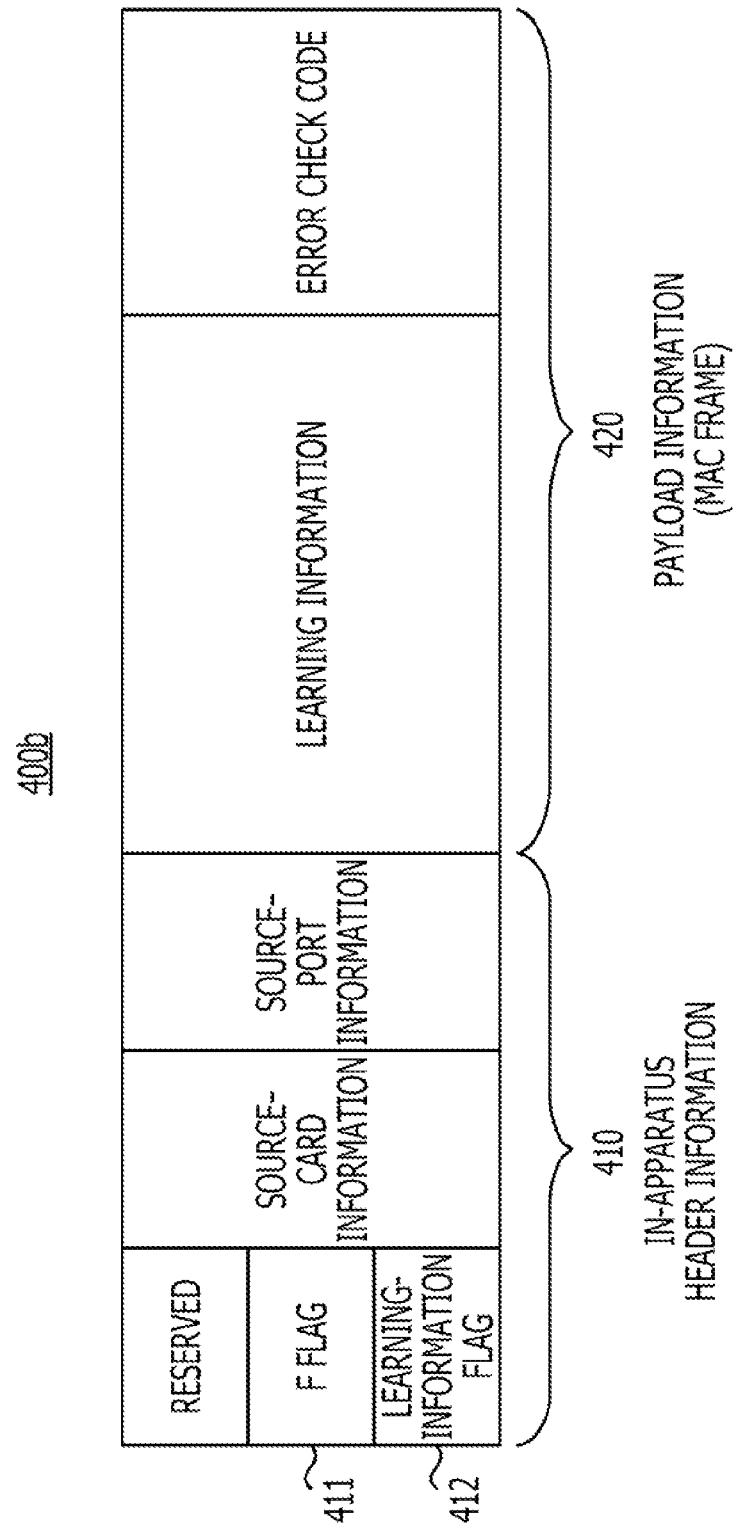
FIG. 6 illustrates the data structure of a learning-information frame.

The learning-information frame 400b will now be described with reference to FIG. 6. FIG. 6 illustrates the data structure of a learning-information frame 400b.

As illustrated in FIG. 6, the learning-information frame 400b includes in-apparatus header information 410 and payload information 420, as in the data frame 400a described above. The in-apparatus header information 410 in the learning-information frame 400b may be the same as the in-apparatus header information in the data frame 400a.

When the frame 400 is a data frame 400a, a flag value indicating that the frame 400 is a data frame 400a is set for a learning-information flag 412 included in the in-apparatus header information 410. On the other hand, when the frame 400 is a learning-information frame 400b, a flag value indicating that the frame 400 is a learning-information frame 400b is set for the learning-information flag 412. A description below is given in conjunction with an example in which "0" is used as a flag value indicating that the frame 400 is a data frame 400a and "1" is used as a flag value indicating that the frame 400 is a learning-information frame 400b.

The payload information 420 in the learning-information frame 400b includes learning information indicating the contents of the MAC address table 141. The learning information included in the payload information 420 includes an entry for the MAC destination address 421 included in the data frame 400a. The learning information included in the payload information 420 may further include part or all of an entry other than an entry for the MAC destination address 421 included in the data frame 400a.

In the example illustrated in FIG. 6, the data structure of the learning-information frame 400b is substantially the same as the data structure of the data frame 400a. However, the data structure of the learning-information frame 400b may be different from the data structure of the data frame 400a. The size of the learning-information frame 400b may also be substantially the same as or different from the size of the data frame 400a.

Referring back to FIG. 5, the MAC-SA processor 1254 determines whether or not an entry for the MAC source address 422 included in the data frame 400a is contained in the MAC address table 141. That is, the MAC-SA processor 1254 determines whether or not an entry including the same MAC address as the MAC source address 422 included in the data frame 400a is contained in the MAC address table 141. It is preferable that the MAC address table 141 referred to by the MAC-SA processor 1254 be the MAC address table 141 stored in the line card 10 including this MAC-SA processor 1254. In other words, it is preferable that the MAC address table 141 referred to by the MAC-SA processor 1254 not be the MAC address table 141 stored in the line card 10 other than the line card 10 including this MAC-SA processor 1254.

When an entry for the MAC source address 422 is not contained in the MAC address table 141, the MAC-SA processor 1254 extracts the MAC source address 422, the source-card information, and the source-port information included in the data frame 400a and also adds the extracted the MAC source address 422, source-card information, and source-port information to the MAC address table 141 as a new entry. On the other hand, when an entry for the MAC source address 422 is contained in the MAC address table 141, the MAC-SA processor 1254 does not need to perform the new-entry addition processing. Subsequently, the MAC-SA processor 1254 outputs the data frame 400a to the header delete circuit 1255.

The header delete circuit 1255 deletes the in-apparatus header information 410 in the data frame 400a. The header delete circuit 1255 transmits the data frame 400a in which the in-apparatus header information 410 is deleted (i.e., transmits the MAC frame) to the terminal apparatus via the physical port 110.

The learning-information frame processor 126 performs processing on the learning-information frame 400b. The learning-information frame processor 126 includes a learning-information processor 1261 and a frame discard circuit 1262.

The learning-information processor 1261 adds, to the MAC address table 141, a new entry indicated by the learning information included in the learning-information frame 400b. The learning-information processor 1261 outputs the learning-information frame 400b to the frame discard circuit 1262.

The frame discard circuit 1262 discards the learning-information frame 400b.

(4) Operation of Line Card

The operation of each of the line cards 10 included in the bridge apparatus 1 will be described below with reference to FIGS. 7 and 8.

(4-1) Operation of Ingress Line Card

The operation of each ingress line card 10 of the line cards 10 included in the bridge apparatus 1 will first be described with reference to FIG. 7. FIG. 7 illustrates a flow of operations of each ingress line card 10 of the line cards 10 included in the bridge apparatus 1. The ingress line card 10 is the line card 10 that performs the above-described ingress processing. The ingress line card 10 performs processing for, for example, receiving a MAC frame transmitted from the terminal apparatus via the physical port 110 and transmitting a frame 400 including the MAC frame to the egress line card 10 through the switch fabric 20.

Figure 7:
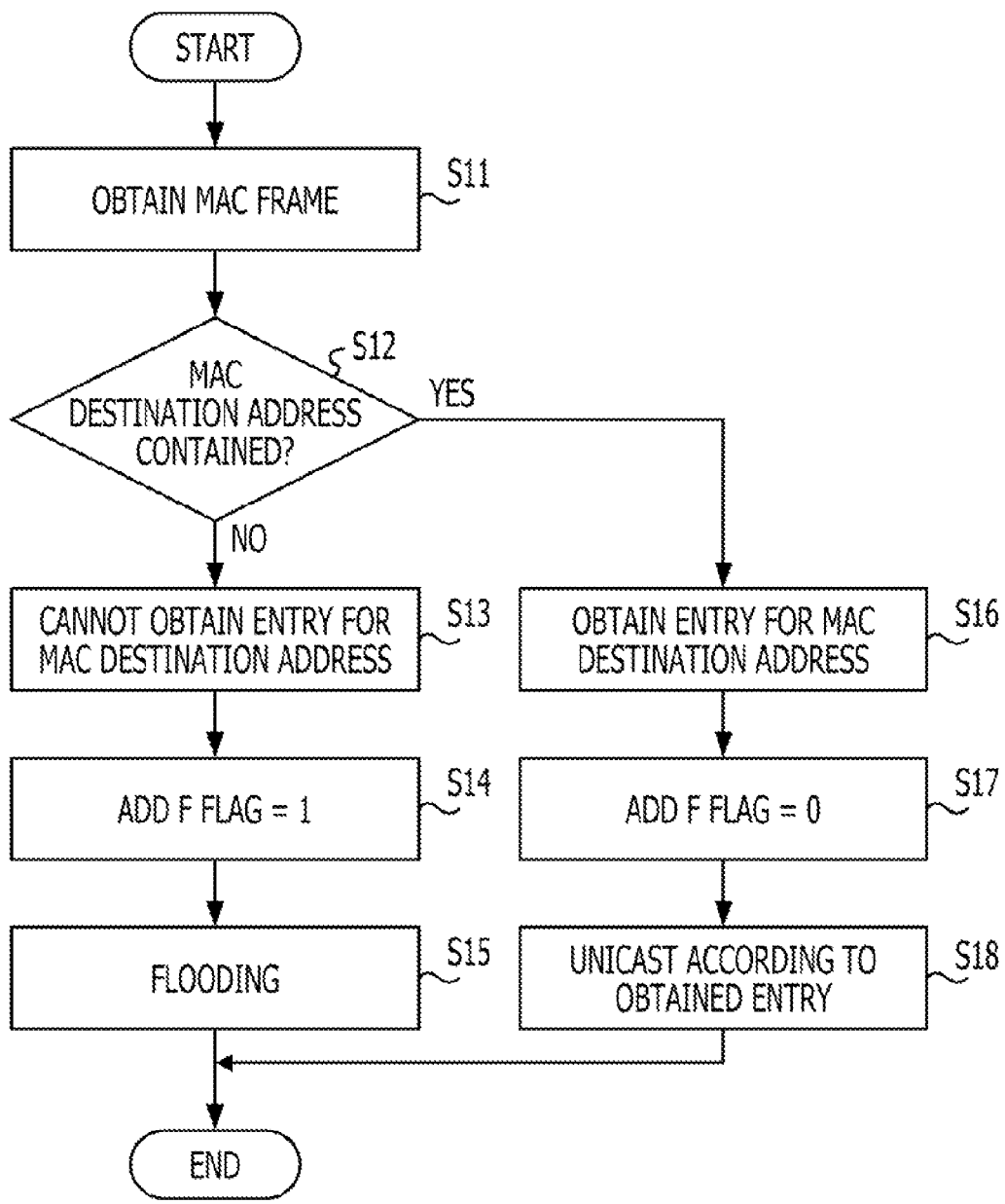
FIG. 7 illustrates a flow of operations of the ingress line card of the line cards included in the bridge apparatus.

As illustrated in FIG. 7, in operation S11, the ingress line card 10 obtains a MAC frame transmitted from the terminal apparatus via the physical port 110. Thereafter, in operation S12, the MAC DA search circuit 1211 determines whether or not an entry for the MAC destination address 421 included in the obtained MAC frame is contained in the MAC address table 141. That is, the MAC DA search circuit 1211 determines whether or not an entry for the MAC destination address 421 included in the obtained MAC frame is contained in the MAC address table 141 in the ingress line card 10.

When the result of the determination in operation S12 indicates that an entry for the MAC destination address 421 is not contained in the MAC address table 141 (No in operation S12), the process proceeds to operation S13 in the which MAC DA search circuit 1211 cannot obtain an entry for the MAC destination address 421 from the MAC address table 141. In this case, in operation S14, the F-flag addition processor 1212 sets "1" (i.e., the flag value indicating that an entry for the MAC destination address 421 is not contained in the MAC address table 141) for the F flag 411. Thereafter, in operation S15, the frame transmitter 1213 floods, to all of the other line cards 10 included in the bridge apparatus 1, a data frame 400a including the MAC frame obtained in operation S11 and the F flag 411 set in operation S14.

On the other hand, when the result of the determination in operation S12 indicates that an entry for the MAC destination address 421 is contained in the MAC address table 141 (Yes in operation S12), the process proceeds to operation S16 in which the MAC DA search circuit 1211 obtains the entry for the MAC destination address 421 from the MAC address table 141. In this case, in operation S17, the F-flag addition processor 1212 sets "0" (i.e., the flag value indicating that an entry for the MAC destination address 421 is contained in the MAC address table 141) for the F flag 411. Thereafter, in operation S18, the frame transmitter 1213 unicasts, to the physical port 110 of the line card 10 indicated by the entry obtained in operation S16, a data frame 400a including the MAC frame obtained in operation S11 and the F flag 411 set in operation S17.

(4-2) Operation of Egress Line Card

The operation of each egress line card 10 of the line cards 10 included in the bridge apparatus 1 will be described next with reference to FIG. 8. FIG. 8 illustrates a flow of operations of each egress line card 10 of the line cards 10 included in the bridge apparatus 1. The egress line card 10 is the line card 10 that performs the above-described egress processing. That is, the egress line card 10 performs processing for, for example, receiving a frame 400 transmitted from the ingress line card 10 through the switch fabric 20 and transmitting a MAC frame included in the frame 400 to the terminal apparatus via the physical port 110.

Figure 8:
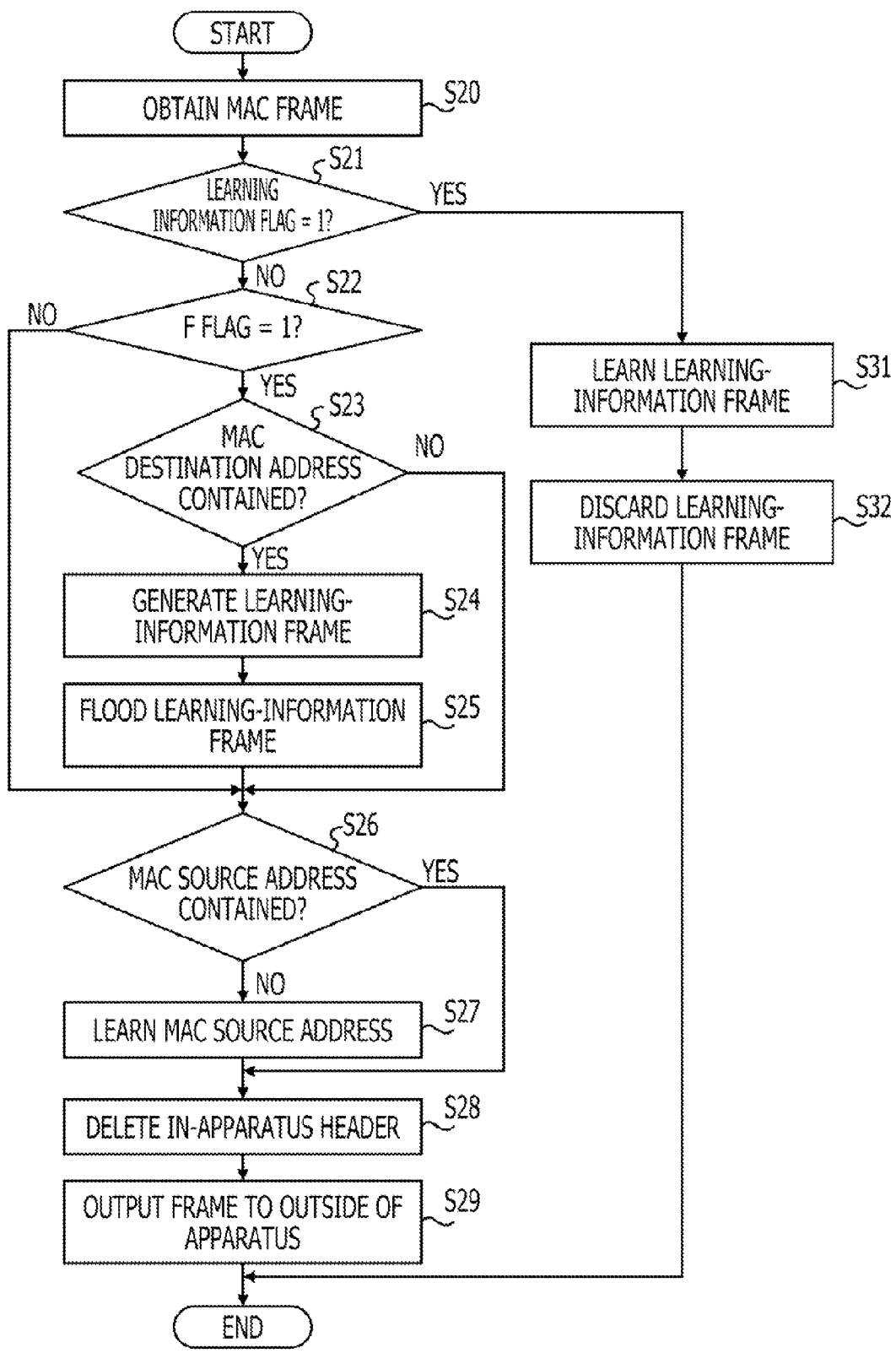
FIG. 8 illustrates a flow of operations of the egress line card of the line cards included in the bridge apparatus.

As illustrated in FIG. 8, in operation S20, the frame receiver 123 included in the egress line card 10 receives a frame 400 (e.g., a data frame 400a or a learning-information frame 400b) transmitted from the ingress line card 10 through the switch fabric 20. Thereafter, in operation S21, the learning-information flag determination circuit 124 determines whether or not the flag value set for the learning-information flag 412 included in the frame 400 is "1"(i.e., the flag value indicating that the frame 400 is a learning-information frame 400b).

When the result of the determination in operation S21 indicates that the flag value set for the learning-information flag 412 is not "1" (No in operation S21), it is determined that the frame 400 is a data frame 400a. Thus, the learning-information flag determination circuit 124 outputs the data frame 400a to the data-frame processor 125.

The data-frame processor 125 performs the following operations on the data frame 400a. First, in operation S22, the F-flag determination processor 1251 determines whether or not the flag value set for the F flag 411 included in the data frame 400a is "1" (i.e., the value indicating that an entry for the MAC destination address 421 is not contained in the MAC address table 141 in the ingress line card 10).

When the result of the determination in operation S22 indicates that the flag value set for the F flag 411 is not "1" (No in operation S22), operation S26 and subsequent operations described below are performed.

On the other hand, when the result of the determination in operation S22 indicates that the flag value set for the F flag 411 is "1" (Yes in operation S22), the process proceeds to operation S23 in which the MAC DA search circuit 1252 determines whether or not an entry for the MAC destination address 421 included in the data frame 400a is contained in the MAC address table 141. That is, the MAC DA search circuit 1252 determines whether or not an entry for the MAC destination address 421 that is not included in the MAC address table 141 in the ingress line card 10 is contained in the MAC address table 141 in the egress line card 10.

When the result of the determination in operation S23 indicates that an entry for the MAC destination address 421 is not contained in the MAC address table 141 (No in operation S23), operation S26 and subsequent operations described below are performed.

On the other hand, when the result of the determination in operation S23 indicates that an entry for the MAC destination address 421 is contained in the MAC address table 141 (Yes in operation S23), the learning-information generator 1253 generates a learning-information frame 400b in operation S24. In this case, it is preferable that the MAC DA search circuit 1252 output, to the learning-information generator 1253, the contents of the MAC address table 141 referred to during the determination in operation S23. The learning-information generator 1253 generates the learning-information frame 400b on the basis of the contents of the MAC address table 141 output from the MAC DA search circuit 1252. The learning-information generator 1253, however, may refer to the MAC address table 141 to generate the learning-information frame 400b. In this case, the MAC DA search circuit 1252 does not need to output, to the learning-information generator 1253, the contents of the MAC address table 141 referred to during the determination in operation S23.

In operation S25, the learning-information generator 1253 floods, to all of the line cards 10 included in the bridge apparatus 1, the learning-information frame 400b generated in operation S24.

In operation S26, the MAC-SA processor 1254 determines whether or not an entry for the MAC source address 422 included in the data frame 400a is contained in the MAC address table 141. Operation S26 may be performed before, after, or in parallel with operations S23 to S25. That is, the MAC-SA processor 1254 determines whether or not an entry for the MAC source address 422 included in the data frame 400a is contained in the MAC address table 141 in the egress line card 10.

When the result of the determination in operation S26 indicates that an entry for the MAC source address 422 is contained in the MAC address table 141 (Yes in operation S26), operation S28 described below is performed.

On the other hand, when the result of the determination in operation S26 indicates that an entry for the MAC source address 422 is not contained in the MAC address table 141 (No in operation S26), the MAC-SA processor 1254 learns the MAC source address 422 in operation S27. More specifically, the MAC-SA processor 1254 extracts the MAC source address 422, the source-card information, and the source-port information included in the data frame 400a. Thereafter, the MAC-SA processor 1254 adds the extracted MAC source address 422, source-card information, and source-port information to the MAC address table 141 as a new entry.

Thereafter, in operation S28, the header delete circuit 1255 deletes the in-apparatus header information 410 in the data frame 400a. In addition, in operation S29, the header delete circuit 1255 outputs the data frame 400a in which the in-apparatus header information 410 is deleted (i.e., transmits the MAC frame) to the outside of the bridge apparatus 1. That is, the header delete circuit 1255 transmits the data frame 400a in which the in-apparatus header information 410 is deleted (i.e., transmits the MAC frame) to the terminal apparatus via the physical port 110.

On the other hand, when the result of the determination in operation S21 indicates that the flag value set for the learning-information flag 412 is "1" (Yes in operation S21), it is determined that the received frame 400 is a learning-information frame 400b. Thus, the learning-information flag determination circuit 124 outputs the learning-information frame 400b to the learning-information frame processor 126.

The learning-information frame processor 126 performs the following operations on the learning-information frame 400b. First, in operation S31, the learning-information processor 1261 learns the learning information included in the learning-information frame 400b. More specifically, the learning-information processor 1261 adds, to the MAC address table 141 in the egress line card 10, a new entry indicated by the learning information included in the learning-information frame 400b. Thereafter, in operation S32, the frame discard circuit 1262 discards the learning-information frame 400b.

(5) Specific Example

A specific example of changes in the state of the bridge apparatus 1 when the operations in FIGS. 7 and 8 are performed will now be described with reference to FIGS. 9 to 13. FIGS. 9 to 13 are schematic diagrams illustrating processes in a specific example of a state transition of the bridge apparatus 1 when the operations in FIGS. 7 and 8 are performed.

Figure 9:
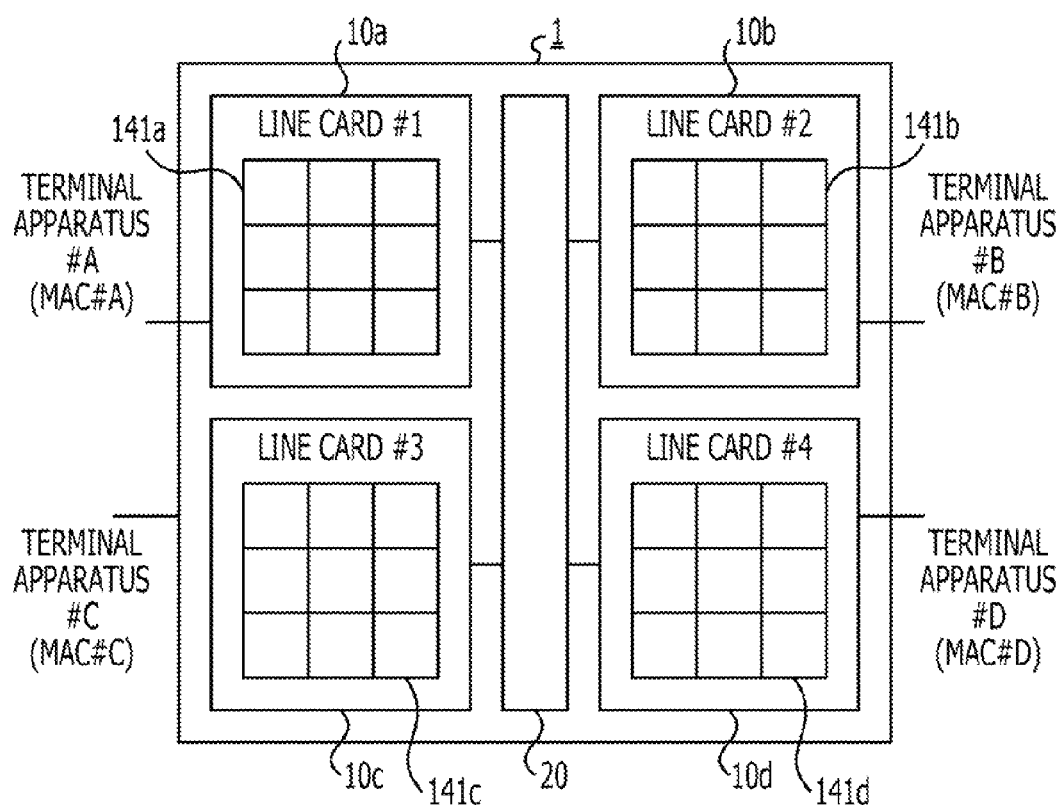
FIG. 9 is a schematic diagram illustrating one process in a specific example of a state transition of the bridge apparatus when the operations illustrated in FIGS. 7 and 8 are performed.

A description will be given in conjunction with, as illustrated in FIG. 9, an example of a bridge apparatus 1 in which a line card 10a with card-identification number "card #1", a line card 10b with card-identification number "card #2", a line card 10c with card-identification number "card #3", and a line card 10d with card-identification number "card #4" are interconnected through a switch fabric 20. The line card 10a has a physical port 110 which has port-identification number "port #1" and to which a terminal apparatus #A having a MAC address "MAC #A" is coupled. The line card 10b has a physical port 110 which has port-identification number "port #1" and to which a terminal apparatus #B having a MAC address "MAC #B" is coupled. The line card 10c has a physical port 110 which has port-identification number "port #1" and to which a terminal apparatus #C having a MAC address "MAC #C" is coupled. The line card 10d has a physical port 110 which has port-identification number "port #1" and to which a terminal apparatus #D having a MAC address "MAC #D" is coupled. It is assumed that, in an initial state, a MAC address table 141a included in the line card 10a contains no entries. Similarly, it is assumed that, in the initial state, a MAC address table 141b included in the line card 10b contains no entries, a MAC address table 141c included in the line card 10c contains no entries, and a MAC address table 141d included in the line card 10d contains no entries.

Figure 10:
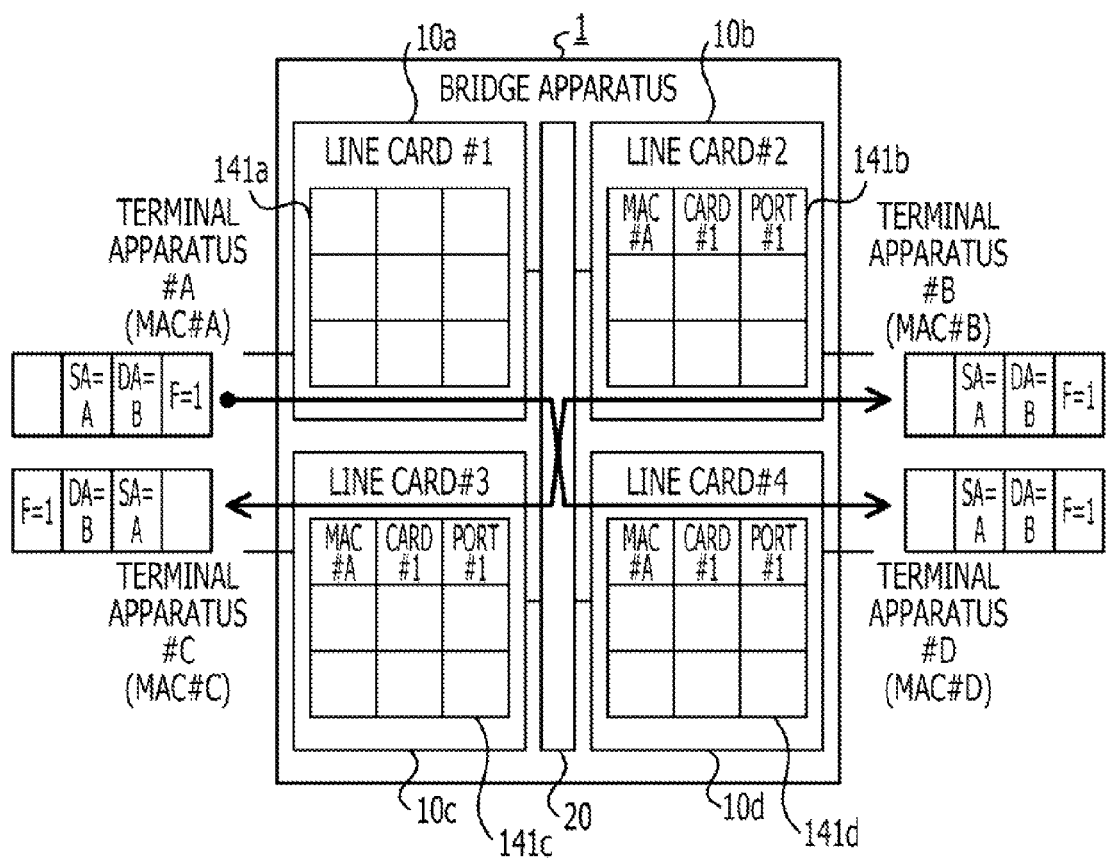
FIG. 10 is a schematic diagram illustrating one process in the specific example of the state transition of the bridge apparatus when the operations illustrated in FIGS. 7 and 8 are performed.

As illustrated in FIG. 10, it is assumed that a MAC frame is forwarded from the terminal apparatus #A to the terminal apparatus #B. In this case, the MAC frame is input from the terminal apparatus #A to the line card 10a. In the state illustrated in FIG. 10, an entry for the MAC destination address 421 (=MAC #B) included in the MAC frame is not contained in the MAC address table 141a. Thus, the line card 10a sets "1" (i.e., the flag value indicating that an entry for the MAC destination address 421 is not contained in the MAC address table 141a) for the F flag 411. The line card 10a floods, to each of the line cards 10b, 10c, and 10d, a data frame 400a in which the F flag 411 is "1 (F=1)", the MAC destination address 421 is "MAC #B (DA=B)", and the MAC source address 422 is "MAC #A (SA=A)".

The line card 10b that has received the data frame 400a determines that an entry for the MAC source address 422 (="MAC #A") included in the data frame 400a is not contained in the MAC address table 141b. Thus, the line card 10b adds an entry for the MAC source address 422 (="MAC #A") to the MAC address table 141b. More specifically, the line card 10b adds an entry in which the MAC source address 422 "MAC #A", the card identification number "card #1" of the line card 10a, and the port identification number "port #1" are associated with each other. A similar operation is also performed by the line cards 10c and 10d.

Figure 11:
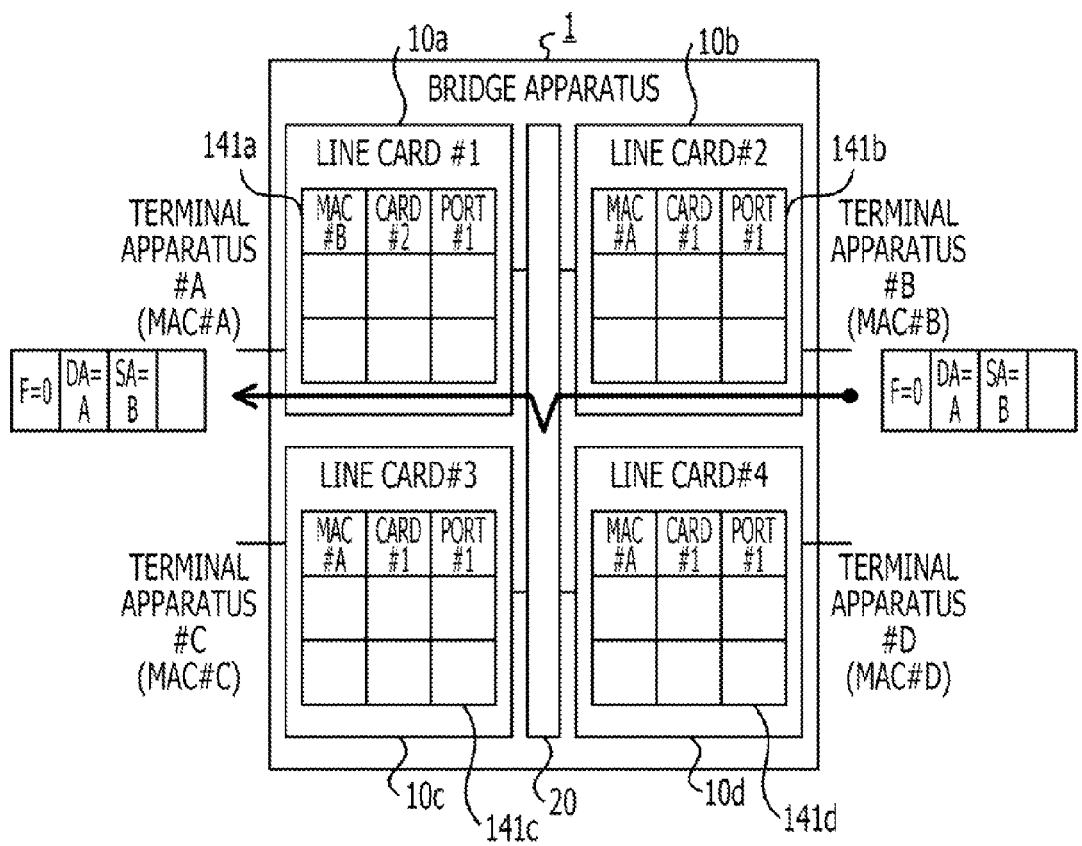
FIG. 11 is a schematic diagram illustrating one process in the specific example of the state transition of the bridge apparatus when the operations illustrated in FIGS. 7 and 8 are performed.

It is assumed that, subsequently, a MAC frame is forwarded from the terminal apparatus #B to the terminal apparatus #A, as illustrated in FIG. 11. In this case, the MAC frame is input from the terminal apparatus #B to the line card 10b. In the state illustrated in FIG. 11, an entry for the MAC destination address 421 (=MAC #A) included in the MAC frame is contained in the MAC address table 141b. Thus, the line card 10b sets "0" (i.e., the flag value indicating that an entry for the MAC destination address 421 is contained in the MAC address table 141b) for the F flag 411. The line card 10b unicasts, to the line card 10a, a data frame 400a in which the F flag 411 is "0 (F=0)", the MAC destination address 421 is "MAC #A (DA=A)", and the MAC source address 422 is "MAC #B (SA=B)".

The line card 10a that has received the data frame 400a determines that an entry for the MAC source address 422 (="MAC #B") included in the data frame 400a is not contained in the MAC address table 141a. Thus, the line card 10a adds an entry for the MAC source address 422 (="MAC #B") to the MAC address table 141a. More specifically, the line card 10a adds an entry in which the MAC source address 422 "MAC #B", the card identification number "card #2" of the line card 10b, and the port identification number "port #1" are associated with each other.

Figure 12:
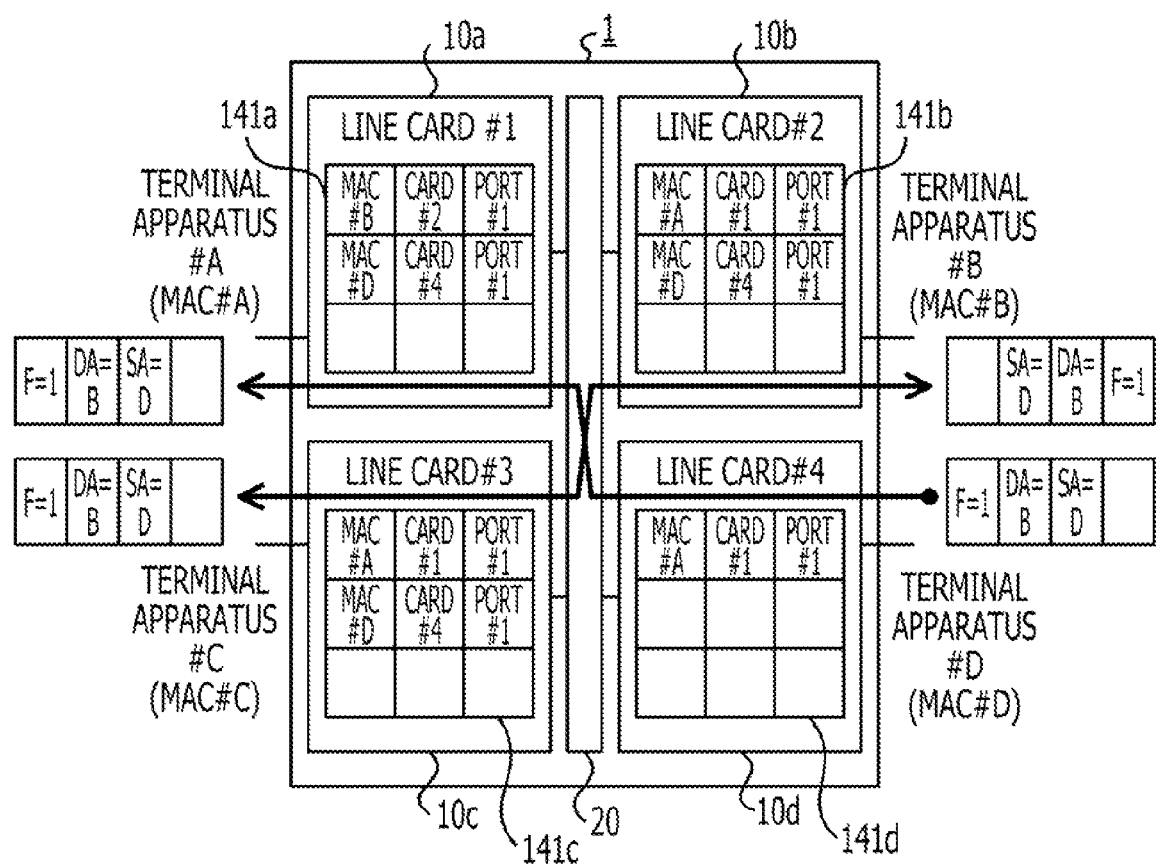
FIG. 12 is a schematic diagram illustrating one process in the specific example of the state transition of the bridge apparatus when the operations illustrated in FIGS. 7 and 8 are performed.

It is assumed that, subsequently, a MAC frame is forwarded from the terminal apparatus #D to the terminal apparatus #B, as illustrated in FIG. 12. In this case, the MAC frame is input from the terminal apparatus #D to the line card 10d. In the state illustrated in FIG. 12, an entry for the MAC destination address 421 (=MAC #B) included in the MAC frame is not contained in the MAC address table 141d. Thus, the line card 10d sets "1" (i.e., the flag value indicating that an entry for the MAC destination address 421 is not contained in the MAC address table 141d) for the F flag 411. The line card 10d floods, to each of the line cards 10a, 10b, and 10c, a data frame 400a in which the F flag 411 is "1 (F=1)", the MAC destination address 421 is "MAC #B (DA=B)", and the MAC source address 422 is "MAC #D (SA=D)".

The line card 10a that has received the data frame 400a determines that an entry for the MAC source address 422 (="MAC #D") included in the data frame 400a is not contained in the MAC address table 141a. Thus, the line card 10a adds an entry for the MAC source address 422 (="MAC #D") to the MAC address table 141a. More specifically, the line card 10a adds an entry in which the MAC source address 422 "MAC #D", the card identification number "card #4" of the line card 10d, and the port identification number "port #1" are associated with each other. A similar operation is also performed by the line cards 10b and 10c.

Figure 13:
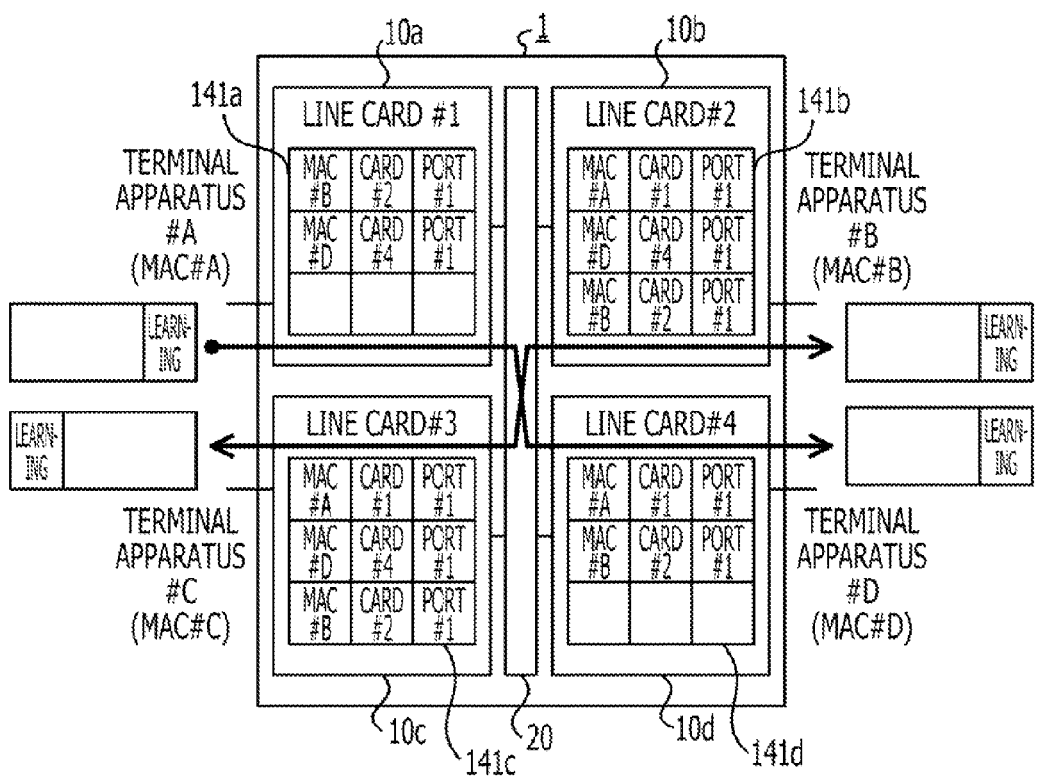
FIG. 13 is a schematic diagram illustrating one process in the specific example of the state transition of the bridge apparatus when the operations illustrated in FIGS. 7 and 8 are performed.

The line card 10a that has received the data frame 400a determines that an entry in which the F flag 411 included in the data frame 400a is "1" and the MAC destination address 421 is "MAC #B" is contained in the MAC address table 141a. Thus, as illustrated in FIG. 13, the line card 10a floods, to each of the line cards 10b, 10c, and 10d, a learning-information frame 400b including the entry for the MAC destination address 421 "MAC #B". As illustrated in FIG. 13, the line card 10b that has received the learning-information frame 400b adds the entry for the MAC destination address 421 "MAC #B" to the MAC address table 141b. Similarly, as illustrated in FIG. 13, the line card 10c that has received the learning-information frame 400b adds the entry for the MAC destination address 421 "MAC #B" to the MAC address table 141c. As illustrated in FIG. 13, the line card 10d that has received the learning-information frame 400b adds the entry for the MAC destination address 421 "MAC #B" to the MAC address table 141d.

As described above, according to the bridge apparatus 1 of the present embodiment, the line card 10 can transmit a frame 400 to which the F flag 411 indicating the presence of an unlearned MAC address (i.e., a MAC address that is not contained in the MAC address table 141) is added. This makes it possible to appropriately issue, to another line card 10, a request for information regarding an unlearned MAC address. Thus, MAC addresses can be efficiently learned between the line cards 10.

In addition, by transmitting a frame 400 to which the F flag 411 is added, the line card 10 can appropriately issue, to another line card 10, a request for the learning information regarding an unlearned MAC address. That is, the line card 10 does not have to transmit, to another line card 10, a request for information regarding an unlearned MAC address, independently of the transmission of the frame 400.

According to the bridge apparatus 1 of the present embodiment, when a first one of the line cards 10 has already learned a MAC address unlearned by a second one of the line cards 10, the first line card 10 can transmit, to the second line card 10, a learning-information frame 400b including the learning information regarding the MAC address unlearned by the second line card 10. Thus, MAC addresses can be efficiently learned between the line cards 10.

According to the bridge apparatus 1 of the present embodiment, each line card 10 can learn an unlearned MAC address by referring to the learning-information frame 400b transmitted from another line card 10. Thus, MAC addresses can be efficiently learned between the line cards 10. Additionally, since the possibility that a MAC address is left unlearned is relatively reduced, the flooding can be suppressed.

According to the bridge apparatus 1 of the present embodiment, the line card 10 can employ a learning-information frame 400b having a data structure or size that is substantially the same as that of a data frame 400a. Hence, the amount of load involved in the processing of the frame 400 can be relatively reduced, compared to a case using a learning-information frame 400b having a data structure or size that is different from that of the data frame 400a.

Although learning of MAC addresses has been described above, the above-described embodiment is not limited to MAC addresses and may be applied to any addresses (e.g., addresses uniquely assigned in a network in accordance with a predetermined principle or rule).

(6) Modifications

A modification of the line card 10 will now be described with reference to FIG. 14. In the modification of the line card 10, the NPU 120 is different from the one in the above-described configuration of the line card 10. Thus, for simplicity of description, a description below is given while attention is paid to the NPU 120, and substantially the same elements as those in the above-described line card 10 are denoted by the same reference numerals and detailed descriptions thereof are not given hereinafter.

Figure 14:
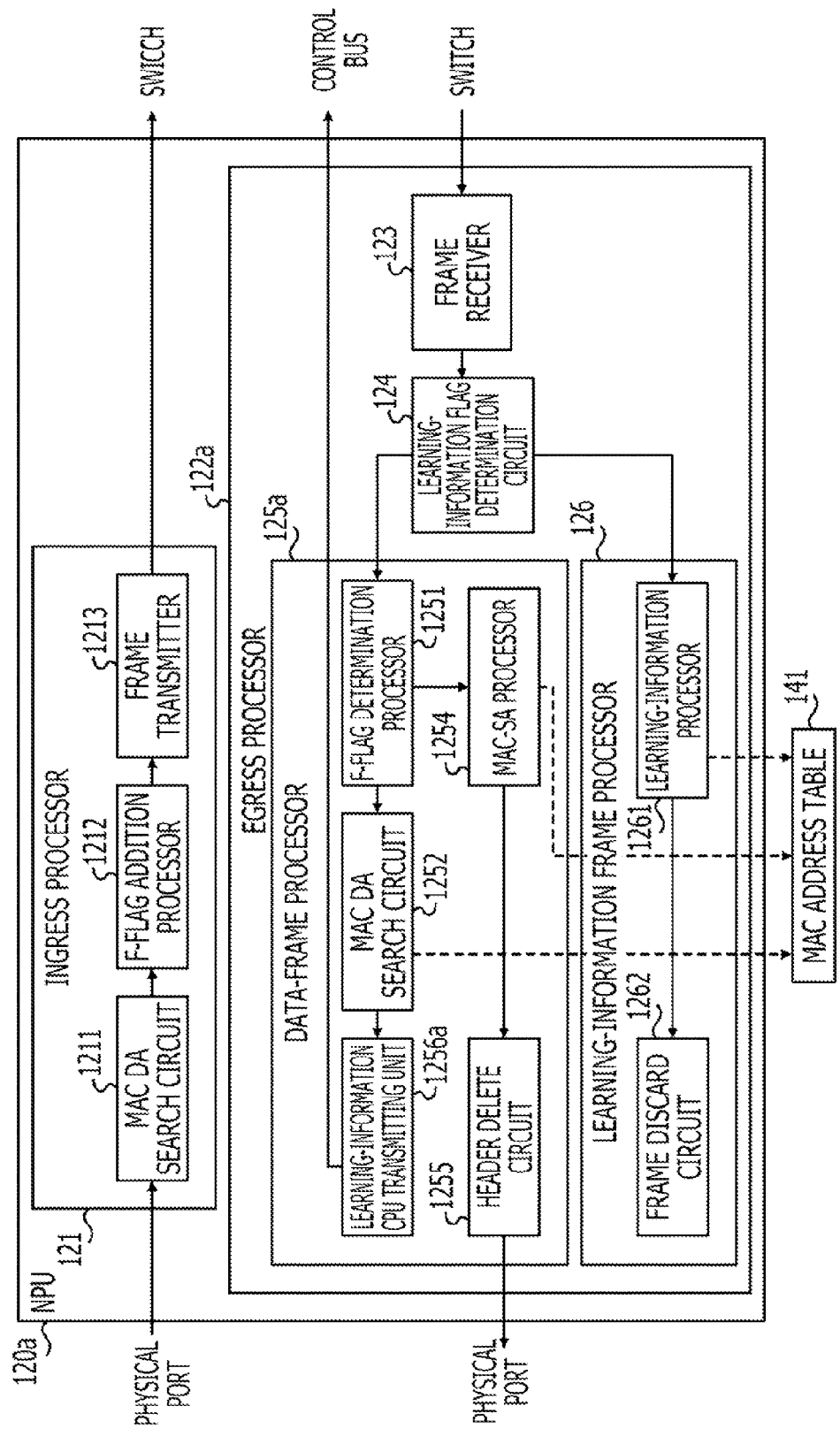
FIG. 14 is a block diagram illustrating the configuration of an NPU in a modification of an embodiment.

As illustrated in FIG. 14, an NPU 120a in the modification includes an ingress processor 121 and an egress processor 122a, as in the NPU 120 described above. The egress processor 122a in the modification includes a frame receiver 123, a learning-information flag determination circuit 124, a data-frame processor 125a, and a learning-information frame processor 126, as in the egress processor 122 described above. The data-frame processor 125a in the modification includes an F-flag determination processor 1251, a MAC DA search circuit 1252, a MAC-SA processor 1254, and an header delete circuit 1255, as in the data-frame processor 125 described above.

The data-frame processor 125a further includes a learning-information CPU transmitter 1256a. The learning-information CPU transmitter 1256a is one example of a second transmitter. When the MAC DA search circuit 1252 determines that an entry for the MAC destination address 421 is contained in the MAC address table 141, the learning-information CPU transmitter 1256a outputs learning information indicating the contents of the MAC address table 141 to the CPU 130.

The CPU 130 then transmits (i.e., floods), through the control bus 30, the learning information to all of the line cards 10 (specifically, to the CPUs 130 in all of the line cards 10) included in the bridge apparatus 1. Alternatively, the CPU 130 may transmit (i.e., unicast), through the control bus 30, the learning information to the line card 10 that is the source of the data frame 400a.

In turn, each CPU 130 that has received the learning information through the control bus 30 outputs the contents of the learning information to the corresponding learning-information processor 1261. The learning-information processor 1261 adds a new entry indicated by the learning information to the corresponding MAC address table 141.

As described above, according to the modification, a first one of the line cards 10 can transmit learning information regarding a MAC address unlearned by a second one of the line cards 10 to the first line card 10, by using a control plane. That is, the first line card 10 does not have to use a user plane through which a frame 400 is transmitted, in order to transmit the learning information regarding a MAC address unlearned by the second line card 10. Accordingly, the first line card 10 can transmit the learning information regarding the MAC address unlearned by the second line card 10 to the second line card 10, without affecting the transmission of the frame 400.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A bridge apparatus comprising:
a second line card, a second memory, a first memory, and a first line card, wherein the first line card includes:
an ingress processor,
wherein the ingress processor includes:
an addition process circuit that adds a first flag to a frame to be transmitted to the second line card, the first flag indicating whether or not a destination address stored in the first memory matches a destination address of the frame to be transmitted; and
a first transmitter that transmits, to the second line card, the frame to which the first flag is added,
wherein the second line card includes an egress processor,
wherein the egress processor includes:
a first receiver that receives the frame to which the first flag is added;
a determination circuit that determines whether or not a destination address stored in the second memory matches the destination address of the received frame when the first flag indicates that the address stored in the first memory does not match the destination address of the frame, and
a second transmitter that transmits, when the determination circuit determines that the address stored in the second memory matches the destination address of the frame, address information associated with at least the destination address of the frame to the first line card.

2. The bridge apparatus according to claim 1, wherein the ingress processor of the first line card further includes:
a second receiver that receives the address information transmitted from the second line card; and
a learning processor that causes the first memory to store the received address information.

3. The bridge apparatus according to claim 1, wherein the second transmitter transmits the address information by using the frame.

4. The bridge apparatus according to claim 2, wherein
the second transmitter transmits the address information by using a frame to which a second flag is added, the second flag indicating whether or not the address information is transmitted; and
on a basis of the second flag, the first line card causes the learning processor to store the address information of the frame to which the second flag is added, when the address information is transmitted using the frame to which the second flag is added, and transmits the frame to which the second flag is added to a destination, when the address information is not transmitted using the frame to which the second flag is added.

5. The bridge apparatus according to claim 1, wherein the second transmitter transmits the address information by using a plane that is different from a user plane for transmitting the frame.

6. The bridge apparatus according to claim 1, wherein at least one of a data structure and a data size of the address information is the same as at least one of a data structure and a data size of the frame.

7. The bridge apparatus according to claim 1, wherein the address information includes a MAC (media access control) address.

8. A bridge apparatus comprising:
a first line card and a second line card,
wherein the first line card includes:
a first memory that stores an association between a line card to which a terminal apparatus is coupled and an address of the terminal apparatus, and
a first processor that executes a program causing the first processor to perform
adding, to a frame to be transmitted, a first flag indicating whether or not an address is stored in the first memory that matches a destination address of the frame, and
transmitting, to the second line card, the frame to which the first flag is added,
wherein the second line card includes:
a second memory that stores an association between a line card to which another terminal apparatus is coupled and an address of the another terminal apparatus, and
a second processor that executes a program causing the second process to perform
receiving the frame transmitted from the first line card,
determining whether or not an address stored in the second memory matches the destination address of the received frame, when the first flag added to the received frame indicates that the first memory does not store the destination address of the frame, and transmitting, upon determining that the address stored in the second memory matches the destination address of the received frame, address information associated with at least the destination address of the received frame to the first line card, the destination address being stored by the second memory.

9. The bridge apparatus according to claim 8, wherein the first processor further performs receiving the address information transmitted from the second line card and causing the first memory to store the received address information.

10. The bridge apparatus according to claim 8, wherein the second processor further performs transmitting the address information by using the frame.

11. The bridge apparatus according to claim 8, wherein
the second processor further performs transmitting the address information by using the frame
to which a second flag is added, the second flag indicating whether or not the address information is transmitted using the received; and
on a basis of the second flag, the first line card causes the address information to be stored, when the address information is transmitted using the received frame, and transmits the received frame to a destination, when the address information is not transmitted using the received frame.

12. The bridge apparatus according to claim 8, wherein the second processor transmits the address information by using a plane that is different from a user plane for transmitting the frame.

13. The bridge apparatus according to claim 8, wherein at least one of a data structure and a data size of the address information is the same as at least one of a data structure and a data size of the frame.

14. The bridge apparatus according to claim 8, wherein the address information includes a MAC (media access control) address.

15. A communication method comprising:
receiving, by a line card, a frame transmitted from another line card, the frame including: destination address and a flag indicating whether or not a first memory associated with the another line card stored the same destination address as was in the received frame;
extracting, by the line card, the destination address and the first flag in the received frame;
when the first flag in the received frame indicates that the destination address in the received frame was not stored in the first memory associated with the another line card and the destination address extracted matched a destination address stored in a second memory of the line card then transmitting address information stored in the second memory to the another line card.

* * * * *